Dec. 6, 1955    C. VARAUD    2,725,716
CYLINDER ESCAPEMENT FOR WATCHMAKING PARTS
Filed May 23, 1952

INVENTOR.
Claude Varaud
BY Young, Emery & Thompson
ATTORNEYS.

United States Patent Office 2,725,716
Patented Dec. 6, 1955

2,725,716

CYLINDER ESCAPEMENT FOR WATCHMAKING PARTS

Claude Varaud, Geneva, Switzerland

Application May 23, 1952, Serial No. 289,560

Claims priority, application Switzerland November 1, 1951

2 Claims. (Cl. 58—119)

The cylinder escapement of the Graham type applied to the various clockwork mechanisms, including the mechanical time fuses and other time tripping devices, has been known for a long time.

The usual Graham cylinder escapement has the drawback of easily blocking itself in the rest position, especially in the clockworks of mechanical time fuses in which the motive power is great and the balance-wheel light, and therefore has a small momentum.

The blocking of the balance-wheel at rest, known as "finger stop," is due to the pressure of the tip of the tooth of the escape wheel, which is stronger when the motive power is greater. This pressure prevents the balance wheel hair-spring from driving the cylinder back to the initial escapement position, which causes disturbances or stopping of the balance wheel.

The object of the present invention is to remedy this drawback and is to provide a construction in which the curved internal and external rest surfaces of the cylinder shell have centers of curvature which are eccentric relative to the rocking axis of the said cylinder.

The attached drawing represents, by way of example, an embodiment of the invention.

Figure 1:
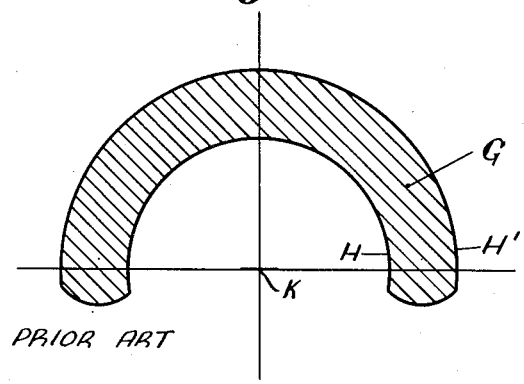
Figure 1 is a transverse cross-section, on an enlarged scale, of a usual cylinder of the Graham type.

In Fig. 1 is shown the usual cylinder G of the Graham type comprising internal and external rest surfaces H and $H^1$ concentric or coaxial with the rocking axis K.

Figure 2:
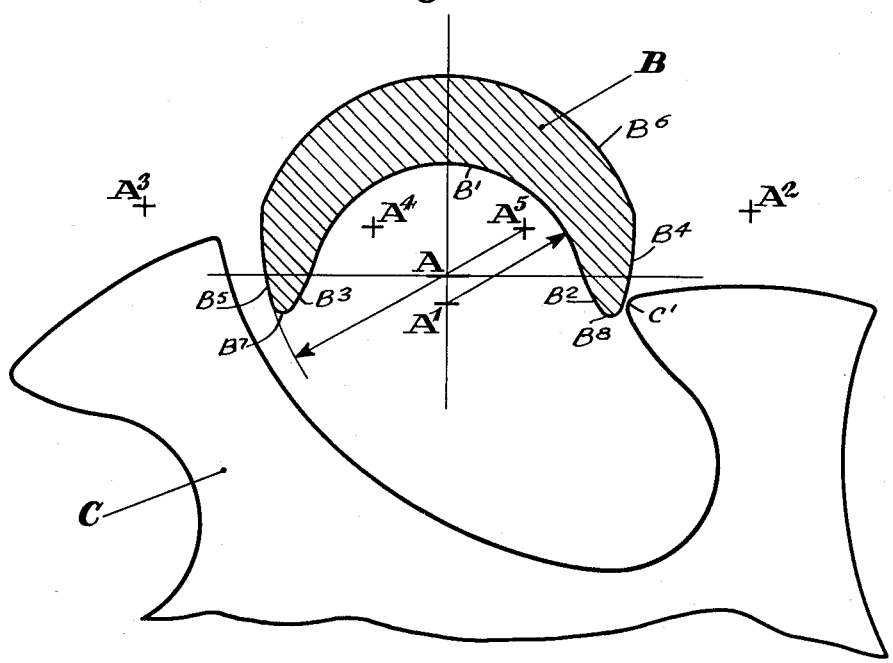
Fig. 2 is a transverse cross-section, on a larger scale, of the cylinder in accordance with the invention, and a partial view of the escapement wheel on a large scale in which one tooth is in a position of rest on the exterior surface of the cylinder.

In Fig. 2 there is shown an escapement embodying the principles of the present invention. In this figure, A indicates the axis of oscillation of the cylinder B and the center of curvature of its outer surface $B^6$, $A^1$ the center of curvature of the inside surface $B^1$ of the cylinder B, and $A^2$ and $A^3$ the centers of curvature of the rest surfaces $B^2$ and $B^3$ respectively of the cylinder, while $A^4$ and $A^5$ are the centers of the curvature of the external rest surface $B^4$ and $B^5$ respectively of the cylinder.

It will be noted that the inner surface $B^1$ of the cylinder B is eccentric with respect to the outer surface $B^6$ and the axis of oscillation A. This makes the shape of the cylinder B of Fig. 2 quite different from that of Fig. 1 and it will be noted that the thickness of the cylinder decreases from the central portion thereof toward its rounded ends $B^7$ and $B^8$.

The cylinder constructed as shown in Fig. 2 provides a device in which the outer rest surfaces $B^4$ and $B^5$ are such that after the cylinder has rocked from a position to bring the surface $B^4$ into engagement with the point $C^1$ of the tooth of the escapement wheel, the force exerted by the tendency of the escape wheel to rotate in a counter-clockwise direction, as shown in Fig. 2, will tend to rock the cylinder B in a counter-clockwise direction about its axis of oscillation A. After the cylinder B has rocked about its axis sufficiently that the point $C^1$ of the tooth of the escapement wheel engages the rounded end $B^8$ of the cylinder, the latter is given an impulse urging it to move in a counter-clockwise direction. The tooth $C^1$ is released when the cylinder has moved sufficiently and the escapement wheel is allowed to rotate until the point $C^1$ comes into engagement with the inner surface $B^1$ of the cylinder B. Since the surface $B^1$ is eccentric with respect to the axis A, the pressure exerted by the point $C^1$ on the surface $B^1$ tends to shift the cylinder B in a clockwise direction. This tendency is increased still more when the point $C^1$ of the tooth of the escapement wheel leaves the surface $B^1$ and engages the surface $B^3$. Finally when tooth $C^1$ engages the rounded end $B^7$ of the cylinder the latter is given an impulse in the clockwise direction.

The surfaces $B^2$ and $B^5$ are used only in installations in which the escape wheel is constructed and arranged to rotate in the opposite direction from that shown.

The cylinder represented on Figure 2 is designed for working regardless of the rotating direction of the escape wheel C. Other curvature shapes can be given to the rest surfaces without departing from the spirit of the invention.

I claim:

1. A cylinder escapement for clockwork mechanisms of mechanical fuses comprising a cylinder mounted for rocking movement about a rocking axis and having a general crescent-shaped cross-section, decreasing in thickness from its central portion towards its ends which are rounded to provide impulse surfaces, said cylinder having an external rest surface adjacent one end, the center of curvature of which rest surface is eccentric with respect to the rocking axis so that the distance between the rocking axis and the external rest surface decreases towards said one end, said cylinder having an internal rest surface adjacent its other end the center of curvature of which internal rest surface is eccentric with respect to the rocking axis so that the distance between the rocking axis and the internal rest surface increases towards said other end.

2. An escapement according to claim 1 in which the center of curvature of the internal rest surface lies intermediate the ends of the cylinder and on the side of the rocking axis remote from the central portion of the cylinder.

References Cited in the file of this patent

UNITED STATES PATENTS

| 31,543 | Humbert | Feb. 26, 1861 |
| 2,196,866 | Juillerat | Apr. 9, 1940 |

OTHER REFERENCES

Horological Review Publication, Oct. 4, 1916 (pp. 129–131), Figs. 14 and 15.